Aug. 23, 1966  D. H. EBERLY, JR  3,268,080

SELF-CLARIFYING FILTER SYSTEM

Filed Sept. 26, 1962  2 Sheets-Sheet 1

INVENTOR
David H. Eberly Jr.

BY

ATTORNEY

Aug. 23, 1966     D. H. EBERLY, JR     3,268,080
SELF-CLARIFYING FILTER SYSTEM
Filed Sept. 26, 1962     2 Sheets-Sheet 2
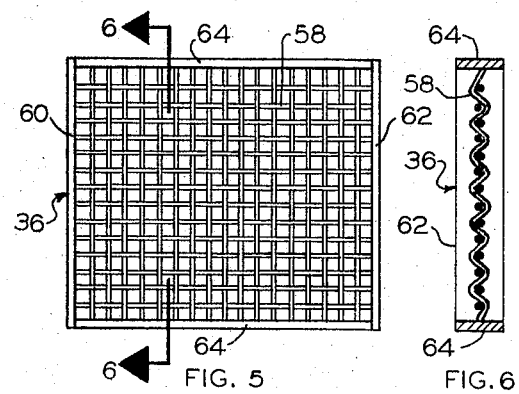
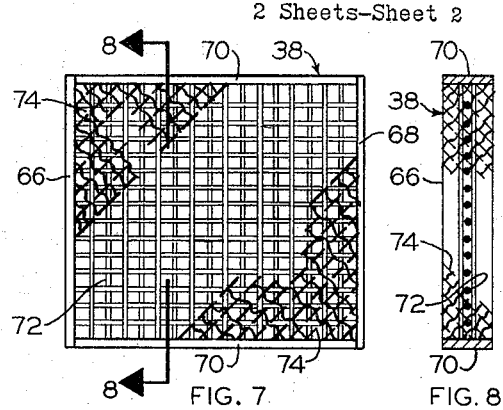
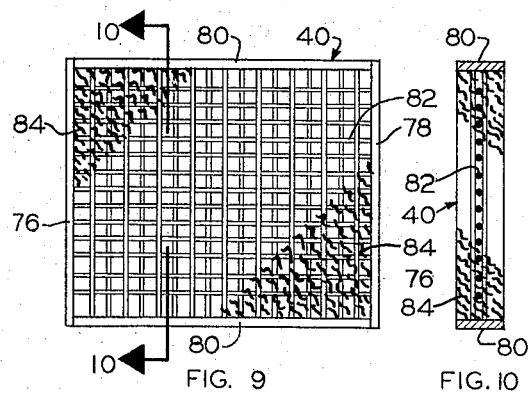
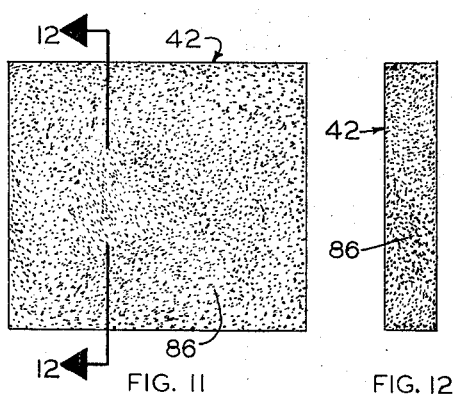
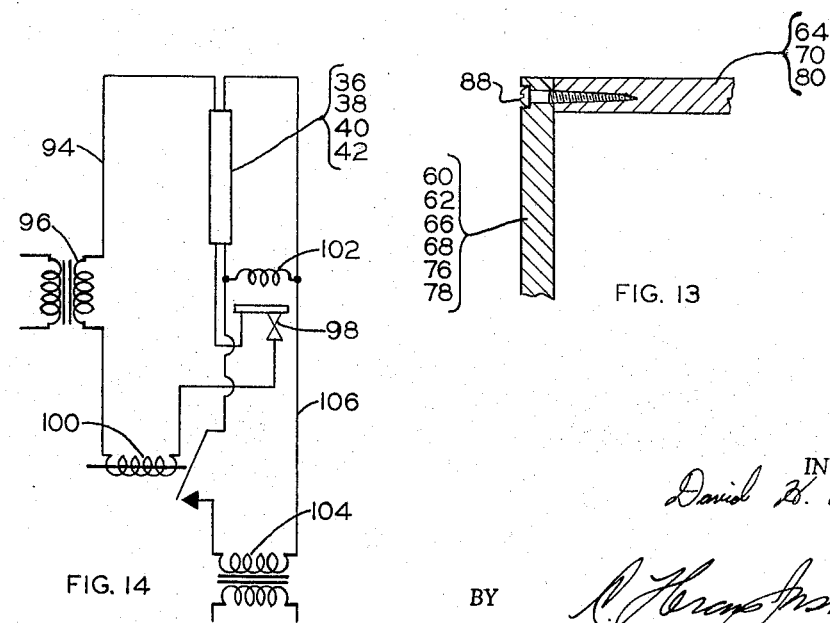

United States Patent Office 3,268,080
Patented August 23, 1966

3,268,080
SELF-CLARIFYING FILTER SYSTEM
David H. Eberly, Jr., York, Pa., assignor, by mesne assignments, to Avco Corporation, Williamsport, Pa., a corporation of Delaware
Filed Sept. 26, 1962, Ser. No. 226,372
5 Claims. (Cl. 210—180)

The present invention pertains to a self-clarifying filter system and, more particularly, one in which the filter elements, per se, are capable of freeing themselves from the clogging effects occasioned by the retention of accumulated material removed from contaminated fluids passing through the filter elements.

There are many installations and systems presently in use requiring the use of filter elements to remove from various kinds of fluids, both liquid and gaseous, certain contaminating substances, many of which are principally carbonaceous in nature and therefore are capable of being burned. Certain typical examples of systems employing filter means of this type comprise sewage treatment and disposal plants, air cleaning units and plants, paper mill operations in which waste waters containing fine fragments of wood pulp are filtered and cleansed, and many other types of systems which require the cleansing of gaseous and liquid fluids of contaminants contained therein.

Cleaning of the filter elements employed in certain of the aforementioned systems so as to restore the filter elements to maximum efficiency long has been a vexing problem. Frequently, very expensive, time-consuming, cumbersome, and therefore highly unsatisfactory methods have been employed to accomplish this function. One of the most common forms of freeing filter elements of the accumulated contaminants removed thereby from the fluid streams passing therethrough is the process of backflushing the system with a clean solution. Sometimes acid bathing of the filter media is required. In other instances, especially where the nature of the filter media permits, subjecting the same to a flame to oxidize the contaminants or entrapments has been resorted to.

Obviously, the aforementioned described conventional methods presently and heretofore used to free such filter elements of contaminants and accumulated entrapments contained therein and thereupon not only requires a manual servicing of the filter elements, but, in addition, such cleansing treatments occasion an extended interruption to the normal flow, whereby the usual filtering operation cannot be undertaken, during that period of time, unless a standby filter system is in readiness to take over. In addition to the loss of service of the filtering system during that period, a further expense is incurred usually by the need to create a reverse pumping operation through a filter system to perform a backwash operation. Followed by this, there also is the problem of disposal of the material backwashed from the filter elements.

It is the principal object of the present invention to provide a filter system employing one or more filter elements, all of the same being self-clarifying, particularly with respect to carbonaceous materials which have been removed from fluids passing through the filter system.

It is another object of the invention to provide a filtering system in which one or more filter elements are rendered self-clarifying by the employment of means to heat the filter elements sufficiently to enable the same to burn, and thereby disintegrate carbonaceous material accumulating in or upon the filter elements, such disintegration of the carbonaceous matter being sufficient to enable the matter then to pass through the filter element upon which it has previously accumulated and such passage being enhanced by the flow of fluid through the filter element, thereby regenerating the filter element substantially to its maximum efficiency, regardless of whether flow through the elements is continuous or intermittent. Such system of regenerating the filter element can be referred to as a firing and forward-flushing regenerative cycle.

A further object of the invention ancillary to the foregoing is to provide the necessary heat to disintegrate the accumulating carbonaceous material by burning the same through the employment of filters which are capable of conducting electric current and thereby acting as a resistance, whereby when the normal resistance of the filter element per se is increased due to the accumulated entrapments of carbonaceous material therein, such increase in resistance is utilized advantageously to generate adequate heat within the filter element to burn the accumulated contaminants, so as to disintegrate the same, and thereby restore the porosity of the filter element substantially to its normal condition.

Still other objects of the invention are to provide current-conductive filter elements made either from suitable metallic substances, such as those conventionally utilized as heating elements in many forms of electrical apparatus, i.e., resistance-type space heaters, electric toasters, and the like, whereby the same will be resistant even to the passage of liquid currents therethrough without disintegration of the filter elements per se.

Still another object of the invention is to provide current-conductive filter elements suitable for filtering from contaminated flowing currents even very fine, small sized contaminating particles, even of micron size and slightly larger, through the employment of porous carbon plates or blocks and so formed by appropriate binders and the like that they possess suitable resistance to rupture and fracture when the heated elements are contacted by liquid currents, or relatively cold gaseous currents, especially after the filter elements have been heated to burn the accumulated contaminants to restore the filter elements to normal efficiency.

One further object of the invention is to provide appropriate current-insulating type supporting means for electrical resistance-type filter elements, such supporting means preferably being in the nature of a conduit through which the stream to be filtered passes, said conduit also preferably being provided with suitable discharge means through which gaseous products of combustion may pass to vent the conduit and filter elements, particularly where substantial quantities of gas may be formed incident to burning the carbonaceous material to restore the filter elements to normal efficiency.

Details of the foregoing objects and of the invention, as well as other objects thereof, are set forth in the following specification and illustrated in the accompanying drawings comprising a part thereof.

In the drawings:

FIG. 5 is a face view of one exemplary filter element per se of a relatively coarse nature.

FIG. 6 is a vertical sectional view of the filter element shown in FIG. 5, as seen on the line 6—6 of FIG. 5.

FIG. 7 is a face view of another type of filter element per se of an intermediate range of porosity.

FIG. 8 is a vertical sectional view of the filter element shown in FIG. 7, as seen on the line 8—8 of FIG. 7.

FIG. 9 is a face view of still another filter element per se of relatively fine porosity.

FIG. 10 is a vertical sectional view of the filter element shown in FIG. 9, as seen on the line 10—10 of said figure.

FIG. 11 is a face view of one further type of filter element of a very fine nature and comprising porous carbon.

FIG. 12 is an end view of the filter element shown in FIG. 11.

FIG. 13 is a fragmentary detail of construction.

FIG. 14 is an exemplary circuit diagram employed in the filter system comprising the invention.

Figure 1:
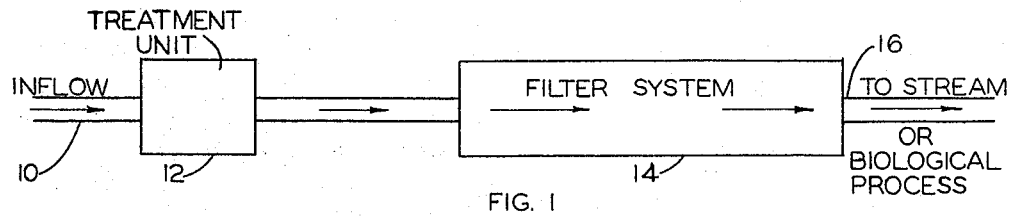
FIG. 1 is an exemplary diagrammatic representation of a treatment arrangement employing a filter system of the type embodying the present invention.

Referring to the drawings, there has been illustrated in FIG. 1 a very simple treatment circuit of a common type in which the filter system comprising the present invention readily may be employed. In this figure, the inflow line 10 discharges into a treatment unit 12, which, for example, may comprise a conventional septic tank, or a more complex form of sewage treatment unit, for example. Frequently, the effluent from a septic tank is not of a satisfactory purity for discharge thereof into streams, for example, particularly according to restrictions of modern day practices, which progressively are requiring higher degrees of purification of effluent before permitting the same to be discharged into streams. Therefore, in accordance with the present invention, the effluent from treatment unit 12 is discharged into filter system 14 for purposes of removing contaminating particles and material of various sizes before the effluent is permitted to pass into discharge conduit 16, from which it exits to an exemplary stream, for example.

The principal invention concerns primarily the filter system 14 in the exemplary treatment arrangement outlined in FIG. 1. While the housing 18 of the filter system 14 may be composed of various kinds of material, it is preferred that the same at least be composed of a substance which is resistant to the passage of an electrical current therethrough, whereby the same is considered an insulating material, such as porcelain, suitable kinds of asbestos-cement compositions, various types of resins, such as urea-formaldehyde condensation products, and various other types and kinds of synthetic resins, many of which are employed in the field of electrical appliances and are capable of withstanding substantial temperatures of the ranges required in the present invention, in accordance with details to be explained hereinafter.

Figure 2:
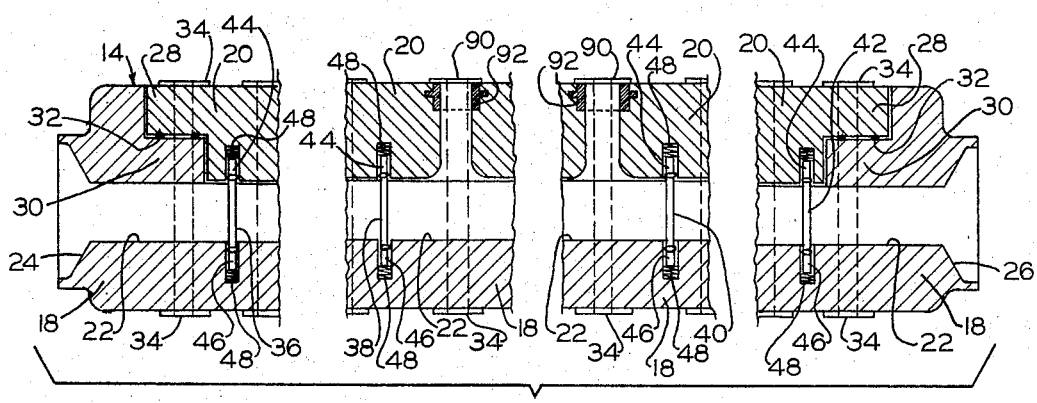
FIG. 2 is a vertical sectional view of an exemplary filter system of the type illustrated in FIG. 1 and embodying the present invention, the same being foreshortened by the employment of interruptions through the view of the system.
Figure 3:
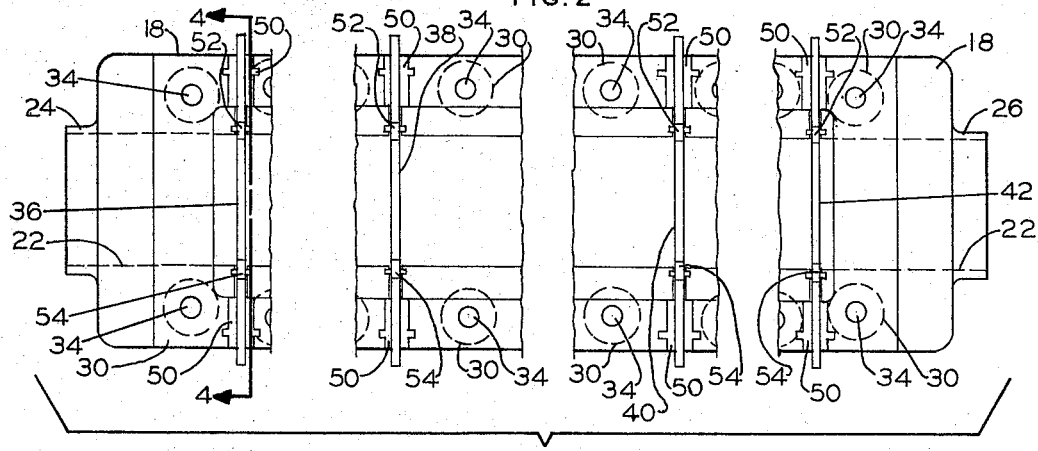
FIG. 3 is a top plan view of the filter system shown in FIGS. 1 and 2, but having the cover of the filter system removed, this view also being foreshortened similarly to the view in FIG. 2.

Details of the filter system 14 embodying the principles of the present invention are best illustrated in overall manner in FIGS. 1–4. Referring to FIG. 2, for example, it will be seen that the housing 18, which is of exemplary shape only, and not to be regarded as restrictive from this view, is provided with a removable wall portion 20, which, as seen in FIG. 2, is uppermost in the figure. In cross-section, as seen from FIG. 4 particularly, the housing 18, when the cover 20 is affixed in place, has a substantially central passage opening 22 therethrough, the opposite ends thereof terminating in suitable entrance and exit means 24 and 26 by which said opposite ends of the filter system 14 may be interconnected into conduit lines, and the like. It will be understood that any appropriate type of preferably fluid and gas-tight connecting means may be used for this purpose, the same employing threads, if desired, which may be molded directly into the material from which the housing 18 is formed, and gaskets.

From FIG. 2, it will be seen that the cover 20 and housing 18 may be provided with suitable sealing means comprising, for example, a marginal flange 28, which abuts against a seating flange 30 formed in the body of housing 18, appropriate sealing gaskets 32 being employed to effect positive gas and liquid-tight sealing between the cover and housing when the two are secured together by any appropriate connecting means, such as bolt-like members 34 which extend at spaced intervals through the marginal and seating flanges 28 and 30 of the cover 20 and housing 18.

Positioned within the passage opening 22, in longitudinally spaced relationship to each other, are a plurality of filter elements 36, 38, 40 and 42, respectively of different degrees of porosity, in accordance with the principles of the invention. Preferably, these various filter elements are of similar length and width, as seen in face view, which is that shown in FIG. 4. These filter elements preferably are current-conducting and have substantially uniform sized perimeter areas or portions enabling the same to readily fit between opposed upper and lower sealing members 44 and 46, which may comprise elongated bars of any appropriate type capable of firmly engaging the upper and lower edges of the filter elements. These sealing members 44 and 46 preferably are resiliently urged by any appropriate means, such as springs 48, into firm engagement with the upper and lower marginal portions of the filter elements. For example, the sealing members may be formed, or at least covered with appropriate asbestos sheet material of a somewhat soft nature to enhance the sealing properties thereof.

Figure 4:
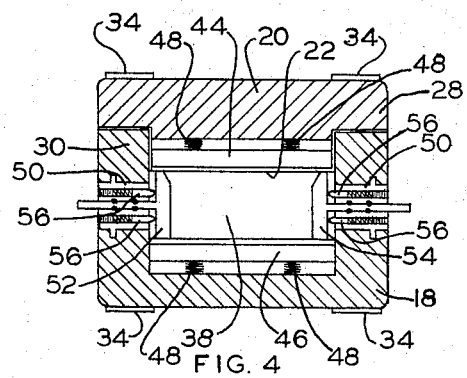
FIG. 4 is a transverse sectional view through the filter system, as seen on the line 4—4 of FIG. 3.

The opposite side walls of the housing 18 are provided with appropriate bushings 50, which have central openings slidably receiving the stems of exemplary T-shaped electrodes 52 and 54 best shown in FIG. 4. The electrodes 52 and 54 are constantly urged into firm engagement with the opposite sides of the filter elements 36, 38, 40 and 42, such firm engagement being effected by any appropriate means, such as spring-pressed plunger 56, or the like. Preferably, the slidable movement of the electrodes 52 and 54 in contacting direction for engagement with the filter elements is restricted by any suitable means, such as a stop nut, or the like, not shown, whereby when the filter elements are removed for replacement, servicing, or the like, from the passage opening 52, as when the cover 20 has been removed, they will not continue to move toward each other any substantial distance. Thus they will be in positions for ready reception of the opposite ends of the filter elements therebetween when such filter elements are reintroduced into the housing. To this end, if desired, the upper liner surfaces of the heads of the electrodes 52 and 54 may be slightly beveled, as shown in exemplary manner in FIG. 4. It also will be understood that the ends of the stem portions of the T-shaped electrodes 52 and 54 may project beyond the exterior surfaces of the side walls of the housing 18 to any desired degree to enable ready connection thereto of electrical bus bars, conduits, wiring, or the like, such projection being shown in exemplary manner in FIGS. 3 and 4.

Referring to FIGS. 5–13, various details of the respective filter elements 36, 38, 40 and 42 are shown in exemplary manner. In accordance with the preferred arrangement of the filter system 14, the filter element 36, which is nearest the entrance end 24 of the unit, and therefore will be contacted first by incoming fluid, whether gaseous or liquid, is of relatively coarse mesh, as shown in exemplary manner in FIG. 5. Solely for purposes of mentioning possible examples of porosity, and without the invention being restricted thereto, the filter element 36 may comprise a woven mesh 58 of, for example ⅛″ or ¼″ spaces being provided, whereby relatively coarse particles of undesirable and/or contaminating material may be entrapped upon the surface of the woven mesh 58, through which smaller size particles and the effluent liquid continue to pass. The physical structure of the filter element 36 preferably comprises an electrode or contact 60 and 62 respectively at opposite sides of the element, these being maintained in spaced relationship by suitable spacers or stretchers 64 of any suitable material, such as a suitable ceramic, asbestos-cement composition, synthetic resin, or the like, so as to maintain the metallic electrodes or contacts 62 in insulated relationship with respect to each other. Nevertheless, the stretchers 64 serve as supporting means for opposite edges of the woven mesh 58 comprising the filter element.

The filter mesh 58 may comprise any suitable electric current-conducting material, such as conventional resistance wire material used in various types of electric resistance heating elements, i.e., those employed in space heaters, electric toasters, and the like, and being capable of comprising resistance elements, which, when having an adequate amount of current imposed thereupon, will be heated sufficiently to ignite and burn carbonaceous material. Such elements even are capable of being heater to incandescence. This type of metallic material readily is available, and many types thereof comprise alloys composed largely of nickel and chromium. If desired, the wire comprising the woven mesh 58 may be woven through appropriate holes formed in the electrode-contacts 60 and 62 and the insulating stretchers 64. It also will be understood that the exemplary illustration of size of the filter elements, shown especially in FIGS. 5–12, is not to be regarded as restrictive, one example of a different face view and shape of such electrode being shown in FIG. 4, for example.

In FIGS. 7 and 8, the exemplary intermediate porosity filter 38 is shown, this comprising opposed electrode-contact members 66 and 68, which are spaced appropriately by insulating stretchers 70, these connected elements comprising a frame insertable into and removable from the appropriate seats therefor formed in the side walls, bottom and/or cover of the housing 18, in the same manner as described above relative to filter element 36. The porosity of intermediate filter element 38, however, is smaller than that of initially-contacted filter element 36 and, for example, may comprise a matrix of woven wire 72, or at least parallel strands of such wire are utilized to form supporting means, for example, for parallel thin pads of metallic wool 74 closely adjacent each other. Such pads or sheets of metallic wool 74, as well as the matrix 72, both may be formed from appropriate resistance-type metal alloys of the same kind as the woven mesh 58 of the filter element 36 are formed, if desired. Further, the disposition of the metallic wool relative to the matrix elements in the filter element 38 may be in any manner as is found convenient and economically expedient, commensurate with maintaining the metallic wool in stable position to effect the entrapment and filtering of intermediate sized particles of undesired and contaminating material from the effluent flowing therethrough.

In FIGS. 9 and 10, the additional intermediate filter element 40 is shown, the same comprising opposed electrode-contact elements 76 and 78, which are maintained in spaced relationship by preferably insulating stretchers 80, for purposes of supporting therebetween a suitable metallic matrix 82, or a plurality of parallel sheets of the same, especially if this comprises sheets of woven metal, and between such matrix elements, appropriate thin pads, or the like, of metallic wool 84 are disposed for filtering purposes. Said wool preferably is of a finer type than the wool 74 in the filter element 38 shown in FIGS. 7 and 8, whereby the interstices of the wool 84 are of a still smaller nature than the interstices in any of the preceding filters, whereby entrapment and removal of still finer sizes of undesirable matter and particles from the flowing stream is accomplished.

The last of the exemplarily contemplated filter elements 42 is illustrated somewhat in diagrammatic manner in FIGS. 11 and 12, the same preferably comprising a plate or block of porous carbon 86. The porosity of the carbon material can be controlled quite accurately during the formation thereof, within reasonable ranges, and such material having the required porosity range is selected and arranged to entrap, and thereby remove from the stream, particles as small as of the order of 0.5 micron in size, if desired. Actually, larger porosity usually is found to be more practical, but the porosity, in any event, is selected to perform the desired final filtering of the effluent before the same is discharged to stream, for example. Also, depending upon the requirements of the filter system in accordance with any material to be filtered relative to any given stream condition, it may be found that it would be best to form the second intermediate filter element 40 from porous carbon, or some equivalent material capable of conducting current, and at the same time serving as a filter element, especially if porosity of such carbon block or sheet is much coarser than that contemplated for the final filter element 42, such as of the order of 40 microns, for example.

For purposes of illustrating one specific, relatively simple, means of connecting the various electrode-contact current-conducting elements of metal, or the like, to the insulating-type stretchers 64, 70 and 80, there is shown in FIG. 13 interengaging end portions of such electrode-contact members and stretchers which may be secured together in any appropriate manner, such as by providing screws 88 extending through appropriate holes and tapped openings in the respective elements, this illustration simply being of an exemplary and non-restrictive nature.

Various types of control means may be utilized and employed for purposes of causing the filter elements to become heated appropriately and sufficiently to ignite and burns, and thereby disintegrate, the collected and entrapped carbonaceous type of undesired contaminating material in the fluid currents, whether the currents are gaseous or liquid, passing through the passage opening 22 of the filter system 14. One very simple means comprises merely a circuit arranged between the projecting stem ends of the T-shaped electrodes 52 and 54 and a source of current of appropriate voltage and amperage, which would be adequate to utilize the inherent resistance of the metallic or carbon filter elements so as to cause the same to be heated to a sufficient temperature to reduce the carbonaceous entrapped material to ashes, or at least disintegrate the same sufficiently by burning that the remaining particles thereof can be flushed through the interstices of the particular filter element upon which they became entrapped. The flushed particles are carried through the filter element by the passage therethrough of the oncoming stream of gas or liquid. Such an electric circuit could be controlled by any appropriate manual switch means of any suitable type, actuated by remote control, if desired, or a timer-type switch, none of which are specifically illustrated herein, in order that the filter elements periodically would be brought to a burning temperature so as to ignite and burn entrapped contaminants on the respective filter elements. It is believed that a simple circuit needs no illustration. In the event such contaminants on any particular filter element are burned sufficiently that the disintegrated or diminished particles pass through the interstices of that element, and the same are entrapped upon the next element having finer or smaller interstices therein, it is possible that the particles have not been reduced as completely as they might be by burning, whereupon the entrapped particles will be further consumed by burning and thereby additionally disintegrated, while entrapped upon said succeeding filters, until, as is contemplated in the ultimate by the present invention, all of the accumulated and collected contaminating materials are substantially or completely burned and reduced to inconsiderable size and inert condition, in which condition they can pass to a stream without constituting any appreciable or recognizable contaminating influence.

It has been found from experiments that conducting the burning of carbonaceous matter, such as contaminants entrapped upon any of the various filter elements, can be accomplished even while completely submerged within liquids, such as water. Under such conditions, particularly if there is a substantial amount of carbonaceous material to be burned, it may be that the resulting gases of combustion are greater in amount than normally can be dissipated by passing through the filter with the stream and, under such conditions, in accordance with the present invention, the housing, and preferably the cover 20 of the filter system 14, is provided with suitable pressure-relief valves 90, which discharge appropriately to atmosphere, for example, and are utilized to discharge such gases. The valve 90 may be of any suitable standard construction and the pressures at which the same open may be adjusted, preferably, to suit various conditions according to the demands of the material being filtered and burned at the filters. Accordingly, the valves 90 are merely illustrated in exemplary manner as being connected to appropriate bushings 92, see FIG. 2, incorporated by molding, for example, in the cover 20 of the filter system 14.

Rather than instigate the burning function of the filter element manually or by a simple timer-type switch in the manner described above, the present invention additionally contemplates the burning functions being instigated as a result of the resistance to the passage of an electric current afforded by the filter element in combination with the accumulation of entrapped contaminants within and upon the filter elements. When, for example, any of the filter elements contains a volume of contaminants comprising more than 50% of the total volume of voids or area of interstices therein, the electric circuit system, to be described, can be set to be responsive to the corresponding resistance of that filter element, so as to activate a relay included in the circuit, and thereby increase the temperature of the filter element sufficiently that burning of the entrapped carbonaceous contaminants takes place.

An exemplary wiring diagram of an automatically operable control circuit for raising the temperature of the filter elements to a degree which is adequate to burn the entrapped contaminants thereon is shown in FIG. 14. Preferably, a relatively intense electric current is used to ignite and burn the entrapments, but, inasmuch as burning takes place in a relatively short time, the overall cost of operating the filter system is highly economical to achieve the firing and forward flushing regenerative cycle principle afforded by the filter system 14.

In accordance with the details of the wiring diagram of FIG. 14, there normally is a low residual current passing through any of the filter elements connected in the circuit 94 which includes a control transformer and a heat-responsive switch 98. There also is a single pole, single throw, normally OFF relay switch 100 in the circuit 94. When the resistance of the filter element increases, with respect to fluid flow, due to the accumulation of entrapped contaminants therein, to a predetermined degree, such as the aforementioned exemplary 50% by volume of the total voids volume, the electrical resistance decreases and relay switch 100 functions to close the circuit 106, which results in closing the circuit through the power transformer 104, which is of relatively high current capacity, as compared to the normal low value of current derived by circuit 94 from control transformer 96. When the filter element is thus supplied with the higher current, the heat generated by the filter element causes incineration, or at least sufficient burning to effect adequate disintegration of the accumulated contaminants entrained upon the various filter elements to enable them to be flushed therethrough.

This burning of the contaminants is effected in a relatively short period of time. As soon as the burning is accomplished adequately to permit substantial clearing of the filter element by flushing the disintegrated material therethrough, the heat-responsive switch 98 activates relay 100 which in turn opens circuit 106 and restores switch 100 to its normally OFF condition, thus the circuit to power transformer 104 is open and the system is restored to its normal, quiescent condition, with only the low value residual current flowing therethrough.

The individual filter elements are protected from becoming unduly heated by the operation of switch 98 which is suitably calibrated so that the filter element cannot be heated beyond a predetermined limit before the switch 98 will open and otherwise cause the control circuit 94 to be restored to its normal, OFF condition, described above, thereby eliminating any possibility of undue harm being imposed upon the filter elements.

It will be understood that the filter elements preferably are each provided with separate circuits respectively controlled by the amount of entrapped contaminants in each filter, rather than the same being all "fired" simultaneously, or in any particular timed or sequential arrangement, and the circuitry described above will be understood to apply preferably to each filter, although a single source of current may be utilized.

Hereinabove, a substantial group of different materials have been mentioned as being suitable for use in the molding or other methods of fabrication of the housing 18 and removable wall portion or cover 20. Such materials are suitable under most operating conditions, but it may be that under some circumstances, particularly if the filter system is being utilized substantially to maximum capacity and relatively frequent igniting of the accumulated material on the various filter elements occurs, it can be appreciated that additional means and facilities should be provided, especially to minimize heat shock. To this end, the housing 18 and removable wall section or cover 20 may be formed from suitable metal, such as aluminum, which has the advantage of not only being rust resistant, but also has a high co-efficient of heat conductivity so as to dissipate heat. Other metals, however, are suitable, even cast iron being appropriate although it may be necessary to suitably protect the same against rusting.

When using metal as the material from which the housing 18 and removable wall section or cover 20 are formed, and particularly since the filter elements are arranged in an electric circuit, it is necessary to insulate said elements from the housing in addition to utilizing the insulating bushings 50 for the electrodes 60 and 62. This readily may be accomplished by slightly enlarging the seats or channels within which the electrodes 52 and 54 are mounted, if necessary, to accommodate a suitable coating of insulating material. One highly suitable form of such material has been found to be alumina oxide which may be applied in the form of a plasma spray and comprises highly effective electrical insulation means. In addition, however, this form of electrical insulation material has the added advantage of providing insulation against heat shock to a higher degree of efficiency. Therefore, this form of insulation greatly enhances the reliability of the entire filter unit and especially the functioning and life of the filter elements.

Particularly in regard to the filter elements 40 and/or 42, which are stated hereinabove as possessing different degrees of porosity and being made from porous carbon blocks or plates, alumina oxide also may be applied to both of the opposite filtering faces of said filter elements, preferably in the form of a plasma spray, since such spray provides a porous covering that does not retard or interfere with the filtering function of the porous carbon filter elements. Further, the opposed edges of such filter elements which are not engaged by the electrodes likewise may be covered with such alumina oxide insulation spray but those edges of the filter elements which are in contact with the electrodes 52 and 54 will not be sprayed. Likewise, if preferred, the edges of all of the filters which engage the housing and removable wall in any way may be similarly insulated with such spray, either in addition to or instead of insulating the seats therefor in said housing and removable wall.

When the porous carbon filter elements thus are sprayed with alumina oxide as described, such coating or covering serves additionally as a thermal barrier to induce and insure uniform heating throughout the element when subjected to electric currents for purposes of causing disintegration or incineration of the accumulated carbonaceous material upon the filter, thereby reducing and largely overcoming thermal stresses in the carbon filter elements. This results in greatly increasing the life of the elements.

From the foregoing, it also can be appreciated that by the use of such alumina oxide spray at least in the seating areas within the housing which receive the filter elements, the thermal insulation properties of such alumina oxide coating also affords heat insulation between the heat-generating elements and the housing, thereby conserving heat and minimizing the current consumption required to operate the filter unit. The dielectric strength of such alumina oxide coating is fully adequate to be used satisfactorily in the various manners described above.

While the invention has been described and illustrated in its several preferred embodiments, it should be understood that the invention is not to be limited to the precise details herein illustrated and described, since the same may be carried out in other ways falling within the scope of the invention as claimed.

I claim:

1. In a water treatment system, an automatic self-cleaning filter for removing and eliminating ignitable products of carbonaceous sewage material from a fluid flowing through a sewage conduit and for forward flushing said filter system utilizing the normal fluid flow in said conduit, the combination comprising:

a plurality of electric conducting filters longitudinally spaced within said conduit and extending transversely thereacross, the porosity of said filters decreasing in the direction of fluid flow, said conduit being formed of a nonconducting material, said fluid passing through said filters, said particles of carbonaceous material being trapped by said filters, each of said filters being comprised of electric conducting electrical resistance elements, said filters being supported between two spaced electric conducting electrodes and electrically connected thereto, said electrodes being maintained in spaced relationship by two insulated spreader members, said electrodes and said spreader members forming a frame for said filter, said frame being seated within said conduit;

first and second sources of electric current, said second source being relatively small compared with said first source;

a normally open switch for connecting said first source across the electrodes of each of said filters for heating the elements of said filter to a temperature sufficient to ignite said carbonaceous sewage material, whereby the size of said particles is reduced and said particles are forward flushed by the normal fluid flow through said filter;

a relay for closing said switch, said relay having a winding connected in series with said second source across the electrodes of each of said filters, said relay being energized by the currents flowing through said winding to close said switch when the currents through said winding exceed a predetermined level, the electrical resistance of said filters decreasing as trapped particles of carbonaceous sewage material accumulates thereon;

and gas pressure relief means in said conduit adjacent said filters for venting said conduit when the pressure in said conduit, due to the ignition of said materials, exceeds a predetermined magnitude.

2. In a water treatment system, an automatic self-cleaning filter system for removing and eliminating ignitable products of carbonaceous sewage material from a fluid flowing through a sewage conduit and for forward flushing said filter system utilizing the normal fluid flow in said conduit, the combination comprising:

an electric current conducting filter supported in said conduit transversely to said fluid flow, said fluid passing through said filter, said particles of carbonaceous sewage material being trapped by said filter, said filter being comprised of electric conducting electrical resistance elements;

a source of electric current;

a normally open switch for connecting said source across said filter for heating said elements to a temperature sufficient to ignite said trapped particles of carbonaceous sewage material, whereby the size of said particles is reduced and said particles are forward flushed by the normal fluid flow through said filter;

means for closing said switch responsive to a change in the electrical resistance of said filter when it decreases to a predetermined level due to the accumulation of trapped particles of carbonaceous sewage material thereon;

and gas pressure relief means in said conduit adjacent said filter for venting said conduit when the pressure in said conduit due to the ignition of said material exceeds a predetermined magnitude.

3. In a water treatment system, an automatic self-cleaning filter system for removing and eliminating ignitable products of carbonaceous sewage material from a fluid flowing through a sewage conduit and for forward flushing said filter system utilizing the normal fluid flow in said conduit, the combination comprising;

an electric conducting filter supported in said conduit transversely to said fluid flow, said fluid passing through said filter, said particles of carbonaceous sewage material being trapped by said filter, said filter being comprised of electric conducting electrical resistance elements;

first and second sources of electric current, said second source being relatively small compared with said first source;

a normally open switch for connecting said first source across said filter for heating said elements to a temperature sufficient to ignite said trapped particles of carbonaceous sewage material, whereby the size of said particles is reduced and said particles are forward flushed by the normal fluid flow through said filter;

a relay for closing said switch, said relay having a winding connected in series with said second source across said elements, said relay being operated by the currents flowing through said winding to close said switch when the currents through said winding exceed a predetermined level, the electrical resistance of said filter decreasing as the trapped particles of carbonaceous sewage material accumulates thereon;

and gas pressure relief means in said conduit adjacent said filter for venting said conduit when the pressure in said conduit due to the ignition of said material exceeds a predetermined magnitude.

4. The invention as defined in claim 3 wherein said filter is supported between two spaced electric conducting electrodes and electrically connected thereto, said electrodes being maintained in spaced relationship by two insulated spreader members, said electrodes and said spreader members forming a frame for said filter, said sources of electric current being connected across said electrodes, and wherein said conduit is nonconducting.

5. In a water treatment system, an automatic self-cleaning filter system for removing and eliminating ignitable products of carbonaceous sewage material from a fluid flowing through a sewage conduit and for forward flushing said filter system utilizing the normal fluid flow in said conduit, the combination comprising:

- an electric current conducting filter supported in said conduit transversely to said fluid flow, said fluid passing through said filter, said particles of carbonaceous sewage material being trapped by said filter, said filter being comprised of electric conducting electrical resistance elements;
- a source of electric current;
- a normally open switch for connecting said source across said filter for heating said elements to a temperature sufficient to ignite said trapped particles of carbonaceous sewage material, whereby the size of said particles is reduced and said particles are forward flushed by the normal fluid flow through said filter;
- means for closing said switch responsive to the accumulation on said filter of a given amount of trapped carbonaceous sewage material thereon;
- and gas pressure relief means in said conduit adjacent said filter for venting said conduit when the pressure in said conduit due to the ignition of said material exceeds a predetermined magnitude.

References Cited by the Examiner
UNITED STATES PATENTS

| | | | |
|---|---|---|---|
| 2,103,434 | 12/1937 | Pennebaker | 210—185 |
| 2,349,992 | 5/1944 | Schrader | 210—85 X |
| 2,428,939 | 10/1947 | Morris | 210—185 |
| 2,717,957 | 9/1955 | Ohlheiser. | |
| 2,729,338 | 1/1956 | Heigl | 210—67 |
| 2,809,025 | 10/1957 | Pettyjohn. | |
| 2,846,070 | 8/1958 | Schlebusch | 209—238 |
| 2,868,378 | 1/1959 | Burstlein | 209—238 |
| 3,001,295 | 9/1961 | Miller | 55—466 X |

REUBEN FRIEDMAN, *Primary Examiner.*

HERBERT L. MARTIN, *Examiner.*

F. W. MEDLEY, *Assistant Examiner.*